United States Patent
Pu et al.

(10) Patent No.: US 12,427,540 B2
(45) Date of Patent: Sep. 30, 2025

(54) COATING DIE HEAD AND COATING EQUIPMENT

(71) Applicant: Contemporary Amperex Technology (Hong Kong) Limited, Hong Kong (CN)

(72) Inventors: Jingjing Pu, Fujian (CN); Xuyong Liu, Fujian (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 0 days.

(21) Appl. No.: 19/023,440

(22) Filed: Jan. 16, 2025

(65) Prior Publication Data

US 2025/0153211 A1    May 15, 2025

Related U.S. Application Data

(63) Continuation of application No. PCT/CN2023/119093, filed on Sep. 15, 2023.

(30) Foreign Application Priority Data

Nov. 29, 2022 (CN) .......................... 202223186340.7

(51) Int. Cl.
    *B05C 5/02* (2006.01)
(52) U.S. Cl.
    CPC .................. *B05C 5/0254* (2013.01)
(58) Field of Classification Search
    None
    See application file for complete search history.

(56) References Cited

U.S. PATENT DOCUMENTS 3,036,551 A * 5/1962 Shreckhise ......... B05C 11/1047
                                                   118/325
3,461,841 A * 8/1969 Taft ....................... B05C 5/0254
(Continued)

FOREIGN PATENT DOCUMENTS

CN      112893019 A  *  6/2021  ............... B05C 5/02
CN      215030645 U     12/2021
(Continued)

OTHER PUBLICATIONS

International Search Report and Written Opinion mailed on Dec. 26, 2023, received for PCT Application PCT/CN2023/119093, filed on Sep. 15, 2023, 10 pages including English Translation.

*Primary Examiner* — Jethro M. Pence
(74) *Attorney, Agent, or Firm* — XSENSUS LLP

(57) ABSTRACT

A coating die head includes a die head body, at least two driving pieces, and a regulator The die head body is provided with a discharge channel in communication with the outside. The at least two driving pieces are both arranged at the die head body and distributed along a first direction, where the first direction is perpendicular to a discharge direction of the discharge channel. The regulator is a flexible member, at least a part of the regulator is arranged in the discharge channel and connected to the at least two driving pieces, the driving pieces are configured to drive the regulator to move along a second direction in the discharge channel, and the second direction is perpendicular to the first direction and the discharge direction of the discharge channel.

15 Claims, 5 Drawing Sheets

(56) References Cited

U.S. PATENT DOCUMENTS

| | | | | |
|---|---|---|---|---|
| 4,292,349 A * | 9/1981 | Ishiwata | G03C 1/74 | 118/410 |
| 4,520,049 A * | 5/1985 | Nakanishi | B05C 5/0254 | 118/325 |
| 5,294,258 A * | 3/1994 | Jarrell | B32B 5/024 | 118/410 |
| 5,569,494 A * | 10/1996 | Suzuki | B05C 5/0254 | 118/410 |
| 5,750,444 A * | 5/1998 | Jarrell | B32B 5/26 | 118/325 |
| 6,153,265 A * | 11/2000 | Tomaru | B05C 5/0254 | 118/410 |
| 6,303,187 B1 * | 10/2001 | Leino | D21H 23/34 | 118/410 |
| 6,495,196 B1 * | 12/2002 | Innes | B05C 5/001 | 118/712 |
| 6,605,320 B2 * | 8/2003 | Yoshida | B05C 5/0254 | 118/712 |
| 6,808,565 B1 * | 10/2004 | Koyama | B65H 37/007 | 156/577 |
| 7,713,579 B2 * | 5/2010 | Ogawa | B05C 5/0254 | 118/200 |
| 7,927,668 B2 * | 4/2011 | Tanaka | B05C 5/0254 | 427/482 |
| 8,123,511 B2 * | 2/2012 | Cloeren | B29C 48/07 | 425/461 |
| 8,267,039 B2 * | 9/2012 | Ishizu | B05C 5/0254 | 118/679 |
| 9,061,311 B2 * | 6/2015 | Tsuchida | B05C 1/00 | |
| 9,539,606 B2 * | 1/2017 | Park | B05C 5/0254 | |
| 10,005,097 B2 * | 6/2018 | Tanley | B05C 5/0254 | |
| 10,500,605 B2 * | 12/2019 | Son | H01M 10/0585 | |
| 10,820,424 B2 * | 10/2020 | Kim | H05K 3/1241 | |
| 11,413,648 B2 * | 8/2022 | Kim | B05C 5/0254 | |
| 11,511,309 B2 * | 11/2022 | Kim | B05C 5/0262 | |
| 11,850,622 B2 * | 12/2023 | Gao | B05C 1/02 | |
| 11,919,034 B2 * | 3/2024 | Tokieda | H01M 10/0525 | |
| 12,053,796 B2 * | 8/2024 | Lee | H01M 4/0404 | |
| 12,103,036 B2 * | 10/2024 | Lee | B05C 5/0262 | |
| 12,134,107 B2 * | 11/2024 | Lee | B05C 5/0254 | |
| 12,157,140 B2 * | 12/2024 | Lee | B05C 5/027 | |
| 2001/0002281 A1 * | 5/2001 | Mandai | G03C 1/74 | 118/200 |
| 2003/0197076 A1 * | 10/2003 | Iwamoto | B05C 5/0254 | 239/597 |
| 2003/0205201 A1 * | 11/2003 | Shida | H01M 10/0525 | 118/200 |
| 2004/0013807 A1 * | 1/2004 | Chase | B01D 29/111 | 118/100 |
| 2004/0228972 A1 * | 11/2004 | Pekurovsky | B05C 5/0254 | 118/200 |
| 2004/0241327 A1 * | 12/2004 | Wyatt | B29C 48/79 | 118/200 |
| 2005/0000420 A1 * | 1/2005 | Tsuda | B05C 5/0254 | 118/200 |
| 2005/0051084 A1 * | 3/2005 | Lan | B05C 11/025 | 118/200 |
| 2005/0056214 A1 * | 3/2005 | Tomaru | B05C 5/0254 | 118/200 |
| 2005/0211164 A1 * | 9/2005 | Tokimasa | B05C 5/0254 | 118/200 |
| 2008/0213471 A1 * | 9/2008 | Oki | B05C 5/0254 | 427/420 |
| 2010/0285227 A1 * | 11/2010 | Yapel | B05C 5/007 | 118/200 |
| 2013/0260046 A1 * | 10/2013 | Komatsubara | B05C 11/1013 | 118/712 |
| 2015/0266052 A1 * | 9/2015 | Takagi | B05D 1/28 | 118/200 |
| 2015/0352589 A1 * | 12/2015 | Brown | B05C 11/00 | 427/9 |
| 2018/0275071 A1 * | 9/2018 | Choi | G01N 21/8422 | |
| 2023/0080280 A1 * | 3/2023 | Lee | H01M 4/0411 | 118/407 |
| 2023/0085121 A1 * | 3/2023 | Lee | H01M 4/0404 | 239/592 |
| 2023/0127081 A1 * | 4/2023 | Lee | H01M 4/04 | 118/300 |
| 2023/0158539 A1 * | 5/2023 | Lee | B05C 9/06 | 118/313 |
| 2023/0173527 A1 * | 6/2023 | Lee | B05C 5/0254 | 118/410 |
| 2023/0173529 A1 * | 6/2023 | Lee | B05C 9/06 | 118/200 |
| 2023/0173530 A1 * | 6/2023 | Lee | B05C 5/027 | 118/200 |
| 2023/0201861 A1 * | 6/2023 | Lee | H01M 10/0404 | 118/255 |
| 2023/0211370 A1 * | 7/2023 | Lee | B05C 9/06 | 118/300 |
| 2023/0219112 A1 * | 7/2023 | Lee | B05C 5/0262 | 118/125 |
| 2023/0249216 A1 * | 8/2023 | Lee | B05C 5/0254 | 118/125 |
| 2024/0001397 A1 * | 1/2024 | Weng | B05C 5/0254 | |
| 2024/0033771 A1 * | 2/2024 | Lee | H01M 4/04 | |
| 2024/0033774 A1 * | 2/2024 | Lee | H01M 4/0409 | |
| 2024/0050975 A1 * | 2/2024 | Lee | H01M 4/0404 | |
| 2024/0050976 A1 * | 2/2024 | Han | H01M 10/052 | |
| 2024/0116072 A1 * | 4/2024 | Moon | H01M 4/0404 | |
| 2024/0165655 A1 * | 5/2024 | Liu | B05C 5/0254 | |
| 2024/0238827 A1 * | 7/2024 | Yang | B05C 5/0254 | |
| 2024/0253077 A1 * | 8/2024 | Zhai | B05C 5/0262 | |
| 2024/0286164 A1 * | 8/2024 | Zhang | B05C 5/0254 | |
| 2024/0286168 A1 * | 8/2024 | Suzuki | B05C 13/02 | |
| 2025/0041885 A1 * | 2/2025 | Sasaki | B05B 13/0278 | |
| 2025/0041894 A1 * | 2/2025 | Lee | B05C 5/0254 | |
| 2025/0105243 A1 * | 3/2025 | Park | B05C 9/06 | |

FOREIGN PATENT DOCUMENTS

| | | |
|---|---|---|
| CN | 216322970 U | 4/2022 |
| CN | 216459791 U | 5/2022 |
| CN | 218945476 U | 5/2023 |
| JP | H04-347620 A | 12/1992 |
| JP | 2006-205031 A | 8/2006 |

* cited by examiner

COATING DIE HEAD AND COATING EQUIPMENT

CROSS-REFERENCE TO RELATED APPLICATIONS

This application is a continuation of International Application No. PCT/CN2023/119093, filed on Sep. 15, 2023, which claims priority to Chinese Patent Application 202223186340.7, filed on Nov. 29, 2022, and entitled "COATING DIE HEAD AND COATING EQUIPMENT", each are incorporated herein by reference in its entirety.

TECHNICAL FIELD

This application relates to the technical field of coating equipment, and in particular, to a coating die head and a piece of coating equipment that employs the coating die head.

BACKGROUND

To realize thickness regulation of a coating, a coating die head of a piece of coating equipment in the related art is usually provided with a movable regulator to regulate a discharge flow rate of the coating die head, thereby realizing thickness regulation of the coating. However, during use of this type of coating equipment, there is a height difference between regulators when two adjacent driving pieces are driving the regulators for regulation, so that the applied coating correspondingly generates a stepped height difference, thus affecting the coating effect of the coating equipment.

SUMMARY

A main purpose of this application is to provide a coating die head to prevent generation of a stepped height difference during thickness regulation of a coating, so as to improve the coating effect of the coating equipment.

To achieve the above purpose, the coating die head proposed by this application includes:
  a die head body, the die head body is provided with a discharge channel in communication with the outside;
  at least two driving pieces, the at least two driving pieces are both arranged at the die head body and distributed along a first direction, and the first direction is perpendicular to a discharge direction of the discharge channel; and
  a regulator, the regulator is a flexible member, at least a part of the regulator is arranged in the discharge channel and connected to the at least two driving pieces, the driving pieces are configured to drive the regulator to move along a second direction in the discharge channel, and the second direction is perpendicular to the first direction and the discharge direction of the discharge channel.

During use of the coating die head in this solution, a slurry can be extruded out of the discharge channel to a to-be-coated substrate, and then a coating process of the substrate is implemented. Moreover, the coating die head further includes the at least two driving pieces and the regulator, so that a discharge flow rate of the discharge channel can be controlled by using the driving pieces to drive the regulator to move in the discharge channel, thereby realizing thickness regulation of a coating applied onto the substrate. In addition, it is particularly important that the regulator in this solution is a flexible member. Thus, when the driving pieces are driving the regulator to move, the regulator can well deform due to its flexibility, so that the regulator can form a smooth transitional shape in a region between the corresponding two adjacent driving pieces. In this case, the coating can also correspondingly form a smooth transitional shape in this region. In this way, generation of a stepped height difference is prevented during thickness regulation of the coating, thereby improving the coating effect of the coating equipment.

In an embodiment of this application, the discharge channel includes a body section and an outlet section that are in communication with each other in sequence in the discharge direction of the discharge channel.

A cross-sectional area of the outlet section of the discharge channel is less than a cross-sectional area of the body section of the discharge channel. At least a part of the regulator is movable within the outlet section.

In this case, the outlet section is closer to a discharge port of the discharge channel than the body section, so after a flow rate of a slurry at a specific region is regulated by the regulator, the slurry can be quickly extruded out of the discharge port to form a coating with a required thickness, which is unlikely to be affected by flow-in of the slurry at other regions.

In an embodiment of this application, the regulator extends along the first direction to form a long strip-shaped structure.

This provides convenience for the regulator to have a relatively large regulation range, thereby improving the flexibility in thickness regulation of the coating.

In an embodiment of this application, one regulator is provided, and in the first direction, a length of the regulator is the same as a length of the discharge channel.

In this case, the regulator is provided in a quite small number, which can simplify the structure of the coating die head and thus improves the convenience in manufacturing of the coating die head. Moreover, there is only one regulator, which can better prevent the possibility of a thickness difference of the coating between adjacent regulators. The length of the regulator being the same as the length of the discharge channel can ensure that the regulator can still have a large regulation range when it is provided in a quite small number.

In an embodiment of this application, at least two regulators are provided, the at least two regulators are distributed in the first direction, and each regulator is connected to at least two driving pieces.

In the first direction, lengths of the at least two regulators are the same as the length of the discharge channel.

In this case, the arrangement of the at least two regulators ensures that different regulators can be driven to move to realize flexible thickness regulation of different regions of the coating.

In an embodiment of this application, the regulator is made of an anti-corrosion material.

In this case, the regulator can be better prevented from corrosion of the slurry during coating, thereby helping to prolong the service life of the regulator.

In an embodiment of this application, the regulator is a cubic structure.

In this case, the regulator is regular in shape, thereby helping to improve the convenience in manufacturing thereof.

In an embodiment of this application, an inner wall of the discharge channel is provided with a mounting groove, and the regulator is arranged in the mounting groove.

In this case, the mounting groove can provide a mounting space for the regulator, thereby improving the convenience for arranging the regulator. Moreover, the regulator can be provided with a relatively large volume, so that the strength of the regulator is enhanced, thereby providing convenience for the regulator to stably implement subsequent regulation work.

In an embodiment of this application, the die head body is provided with a communicating hole which enables a communication between the mounting groove and the outside, and one end that is of the driving piece and that is far away from the regulator passes through the communicating hole to extend to the outside.

In this case, at least a part of the driving piece is exposed outside, thereby facilitating a drive operation, a maintenance operation, or the like of the driving piece.

In an embodiment of this application, the coating die head further includes a sealing member. The sealing member is disposed between the regulator and a wall of the mounting groove, and the wall communicates with the communicating hole.

In this way, the sealing member exerts a sealing effect. Even if an amount of slurry enters the mounting groove, the sealing effect of the sealing member prevents the slurry from further penetrating into the communicating hole.

In an embodiment of this application, the driving piece is in threaded connection with at least a part of a section of the communicating hole, and the driving piece is rotationally connected to the regulator.

In this way, the driving piece is in threaded connection with the die head body, so that the driving piece is movable while rotating and thus drives the regulator connected thereto to move. Moreover, the driving piece is a pure mechanical structure for driving the regulator and does not involve in a circuit, a gas circuit, and the like, thereby improving the safety of the coating die head during use.

In an embodiment of this application, the regulator is provided with a clamping groove, one end of the driving piece is provided with a clamping head, and the clamping head is clamped into the clamping groove and is rotatable in the clamping groove.

In this way, the driving piece and the regulator are connected through clamping, so that the two can be detached, thereby helping to improve the convenience for maintaining or replacing the regulator and the driving piece.

This application further proposes a piece of coating equipment including the coating die head according to any one of the foregoing embodiments.

BRIEF DESCRIPTION OF DRAWINGS

To describe the technical solutions in some embodiments of this application or the prior art more clearly, the following outlines the drawings to be used in the description of some embodiments of this application or the prior art. Evidently, the drawings outlined below are merely a part of embodiments of this application. A person of ordinary skill in the art may derive other drawings from the illustrated structure without making any creative effort.

REFERENCE NUMERALS IN THE ACCOMPANYING DRAWINGS

Figure 1:
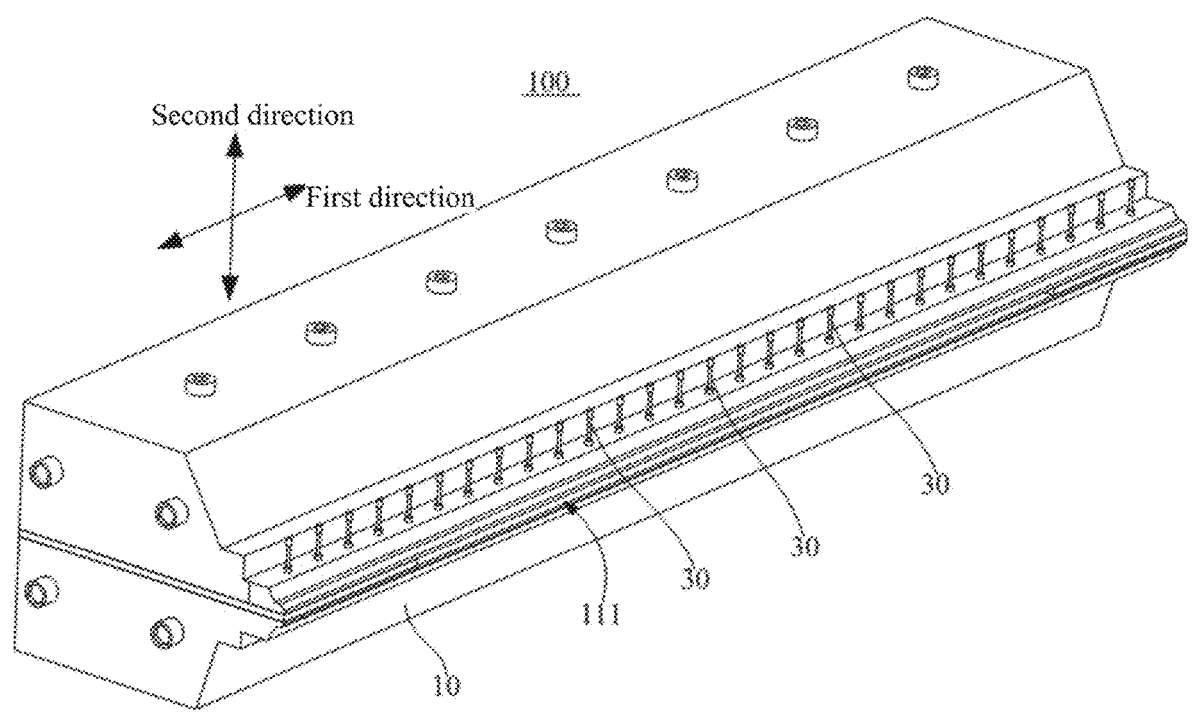
FIG. 1 is a schematic structural diagram of a coating die head according to an embodiment of this application.

| Reference numeral | Name | Reference numeral | Name |
| --- | --- | --- | --- |
| 100 | coating die head | 13 | communicating hole |
| 10 | die head body | 30 | driving piece |
| 11 | discharge channel | 31 | clamping head |
| 111 | discharge port | 50 | regulator |
| 113 | body section | 51 | clamping groove |
| 115 | outlet section | 70 | Sealing member |
| 117 | mounting groove | | |

The objective fulfillment, functional characteristics, and advantages of this application will be described in more detail with reference to the drawings.

DETAILED DESCRIPTION OF EMBODIMENTS

The following clearly and completely describes the technical solutions in the embodiments of this application with reference to the accompanying drawings in the embodiments of this application. Apparently, the described embodiments are merely some but not all of the embodiments of this application. All other embodiments obtained by a person of ordinary skill in the art based on the embodiments of this application without creative efforts shall fall within the protection scope of this application.

It is hereby noted that all directional indicators (for example, up, down, left, right, front, back, and so on) in the embodiments of this application are merely used to explain a relative position relationship, movement state and the like between components in a specific posture (as shown in the drawings). When the specific posture changes, the directional indicators change accordingly.

In this application, unless otherwise specified and defined explicitly, the terms "connection", "fixation", and the like should be understood in their general senses. For example, "fixation" may refer to a fixed connection, a detachable connection, or an integral connection, may refer to a mechanical connection or an electrical connection, and may refer to a direct connection, an indirect connection via an intermediate medium, an internal communication between two elements or an interaction between two elements, unless otherwise defined explicitly. Persons of ordinary skill in the art can understand specific meanings of the above terms in this application as appropriate to specific situations.

In addition, the description referring to "first", "second", and the like are merely for the purpose of description, and shall not be understood as any indication or implication of relative importance or any implicit indication of the number of technical features indicated. Therefore, features defined by "first" and "second" can explicitly or implicitly include at least one of the features. In addition, the meaning of "and/or" appearing throughout the specification includes three parallel solutions. For example, "A and/or B" means a solution of only A, a solution of only B, or a solution of both A and B. Moreover, the technical solutions of the embodiments can be combined with each other as long as they can be implemented by a person of ordinary skill in the art. When the combination of the technical solutions causes a conflict or cannot be implemented, it should be considered that this combination of the technical solutions does not exist and does not fall within the protection scope claimed by this application.

The applicant has noted that in various coating processes, for example, in a production process of a secondary battery, a piece of coating equipment is usually required to apply a prepared pasty viscous slurry onto a substrate. However, in an actual coating process, an edge effect is likely to occur at an edge position of the slurry that is applied, that is, thicknesses of edge regions at two sides of a coating formed by the slurry are greater than a thickness of a middle region. In this case, the uneven thickness of the coating on the substrate affects the performance such as capacity of the battery, and accordingly affects the subsequent use of the battery. Therefore, to ensure normal and stable subsequent use of the battery, it is necessary to control thinning of the slurry coating on the substrate during coating. However, in the related art, to realize thickness regulation of the coating, a coating die head of a piece of coating equipment in the related art is usually provided with a movable regulator, so that the regulator is driven to move in a discharge channel to regulate a discharge flow rate of the coating die head, thereby realizing thickness regulation of the coating. However, during use of this type of coating equipment, there is a height difference between regulators when two adjacent driving pieces are driving the regulators for regulation, so that the applied coating correspondingly generates a stepped height difference, thus affecting the coating effect of the coating equipment.

In view of the above consideration, to improve the coating effect of the coating equipment, the applicant proposes a novel coating die head. In an embodiment of this application, with reference to FIG. 1 and FIG. 2, a coating die head 100 includes a die head body 10, at least two driving pieces 30, and a regulator 50. The die head body 10 is provided with a discharge channel 11 in communication with an outside. The at least two driving pieces 30 are both arranged at the die head body 10 and distributed along a first direction, where the first direction is perpendicular to a discharge direction of the discharge channel 11. The regulator 50 is a flexible member, at least a part of the regulator 50 is arranged in the discharge channel 11 and connected to the at least two driving pieces 30, the driving pieces 30 are configured to drive the regulator 50 to move along a second direction in the discharge channel 11, and the second direction is perpendicular to the first direction and the discharge direction of the discharge channel 11.

The die head body 10 can serve as a body structure of the coating die head 100, for forming the discharge channel 11, mounting the driving pieces 30 and the regulator 50, and the like. The discharge channel 11 includes a feed port and a discharge port 111. A to-be-applied slurry can enter the discharge channel 11 through the feeding port and is then extruded to a substrate through the discharge port 111, and then a coating process of the substrate is implemented. The feeding port may be a circular hole, a square hole, or the like. This is not specifically limited in this application. The coated substrate generally has a large width, so the discharge port 111 can extend along a width direction of the substrate to form a long strip shape, that is, extending along the first direction. In this case, the die head body 10 is correspondingly a long strip-shaped structure extending in the first direction as well, thereby facilitating formation of the long strip-shaped discharge port 111 in a length direction thereof. Certainly, this application is not limited thereto. In other embodiments, the die head body 10 may be approximately a cubic structure. The driving pieces 30 may be configured to drive the regulator 50 to move, and the driving pieces 30 are distributed along the first direction, so that different driving pieces 30 can drive the corresponding regulator 50 to move, thereby realizing thickness regulation of the coating in different regions in the width direction. There may be two, three, or more driving pieces 30. This is not specifically limited in this application. The driving of the driving pieces 30 to the regulator 50 may be implemented as described hereinafter: the driving pieces 30 are in threaded connection with the die head body 10 and thus is movable while rotating with respect to the die head body 10, thereby driving the regulator 50 connected to the driving pieces 30 to move. Certainly, this application is not limited thereto. In other embodiments, the driving pieces 30 may alternatively be cylinders, linear motors, or the like, so as to automatically drive the regulator 50. In this case, the regulator 50 may be arranged at an inner side of the die head body 10 or arranged at an outer side of the die head body 10, as long as the regulator 50 can be driven. The regulator 50 may be configured to regulate a discharge flow rate of the discharge channel 11. Specifically, when the regulator 50 is driven to move by the driving pieces 30, at least a part of the regulator 50 is located in the discharge channel 11. In this way, during movement of the regulator 50, a cross section of the discharge channel 11, through which the slurry can pass at this position, can be regulated. For example, when a regulator 50 is driven to move downwards by a corresponding driving piece 30, a cross section of the discharge channel 11 in a region corresponding to the regulator 50 is reduced, so that a flow rate of the slurry passing through this position can also be reduced, and ultimately the thickness of the coating in a coated region on the substrate corresponding to the regulator 50 can be reduced as well. However, when the regulator 50 moves upwards, a cross section of the discharge channel 11 in a region corresponding to the regulator 50 is increased, so that a flow rate of the slurry passing through this position can also be increased, and ultimately the thickness of the coating in a coated region on the substrate corresponding to the regulator 50 can be increased as well. Therefore, the thickness of the coating on the corresponding region of the substrate can be regulated by driving the regulator 50 to move. Moreover, the regulator 50 is a flexible member, so that when it is driven by each driving piece 30, each position of the regulator 50 can well deform and can form a smooth transitional shape at a position between the corresponding two adjacent driving pieces 30. The regulator 50 may be rubber, silicone, or another deformable object. A specific material of the regulator 50 is not limited in this application, as long as the regulator 50 can be driven by the driving piece 30 and can deform. Further, the regulator 50 may be partially arranged in the discharge channel 11. Certainly, the regulator 50 may be entirely arranged in the discharge channel 11. Alternatively, the regulator 50 is entirely arranged outside the discharge channel 11, as long as the regulator 50 can enter the discharge channel 11 to move so as to regulate the flow rate of the slurry when the regulator 50 is subsequently driven to move by a drive component. In addition, the regulator 50 may be a block structure, a plate structure, a column structure, or the like, as long as it can regulate the discharge flow rate of the discharge channel 11 during movement. Besides, a movement direction of the regulator 50, that is the second direction, can be perpendicular to the discharge direction of the discharge channel 11 and the first direction. This enables the regulator 50 to have a relatively short movement stroke, thereby helping to improve the convenience for driving and arranging it. Moreover, the regulator 50 in this case can well regulate a cross section of the discharge channel 11 for the slurry to pass through at this corresponding position even when the regulator 50 moves a smaller distance, thereby fully regulating the discharge flow rate of the discharge channel 11.

During use of the coating die head 100 in this solution, the slurry can be extruded out of the discharge channel 11 to a to-be-coated substrate, and then the coating process of the substrate is implemented. Moreover, the coating die head 100 further includes the at least two driving pieces 30 and the regulator 50, so that a discharge flow rate of the discharge channel 11 can be controlled by using the driving pieces 30 to drive the regulator 50 to move in the discharge channel 11, thereby realizing thickness regulation of a coating applied onto the substrate. In addition, it is particularly important that the regulator 50 in this solution is a flexible member. Thus, when the driving pieces 30 are driving the regulator 50 to move, the regulator 50 can well deform due to its flexibility, so that the regulator 50 can form a smooth transitional shape in a region between the corresponding two adjacent driving pieces 30. In this case, the coating can also correspondingly form a smooth transitional shape in this region. In this way, generation of a stepped height difference is prevented during thickness regulation of the coating, thereby improving the coating effect of the coating equipment.

Figure 2:
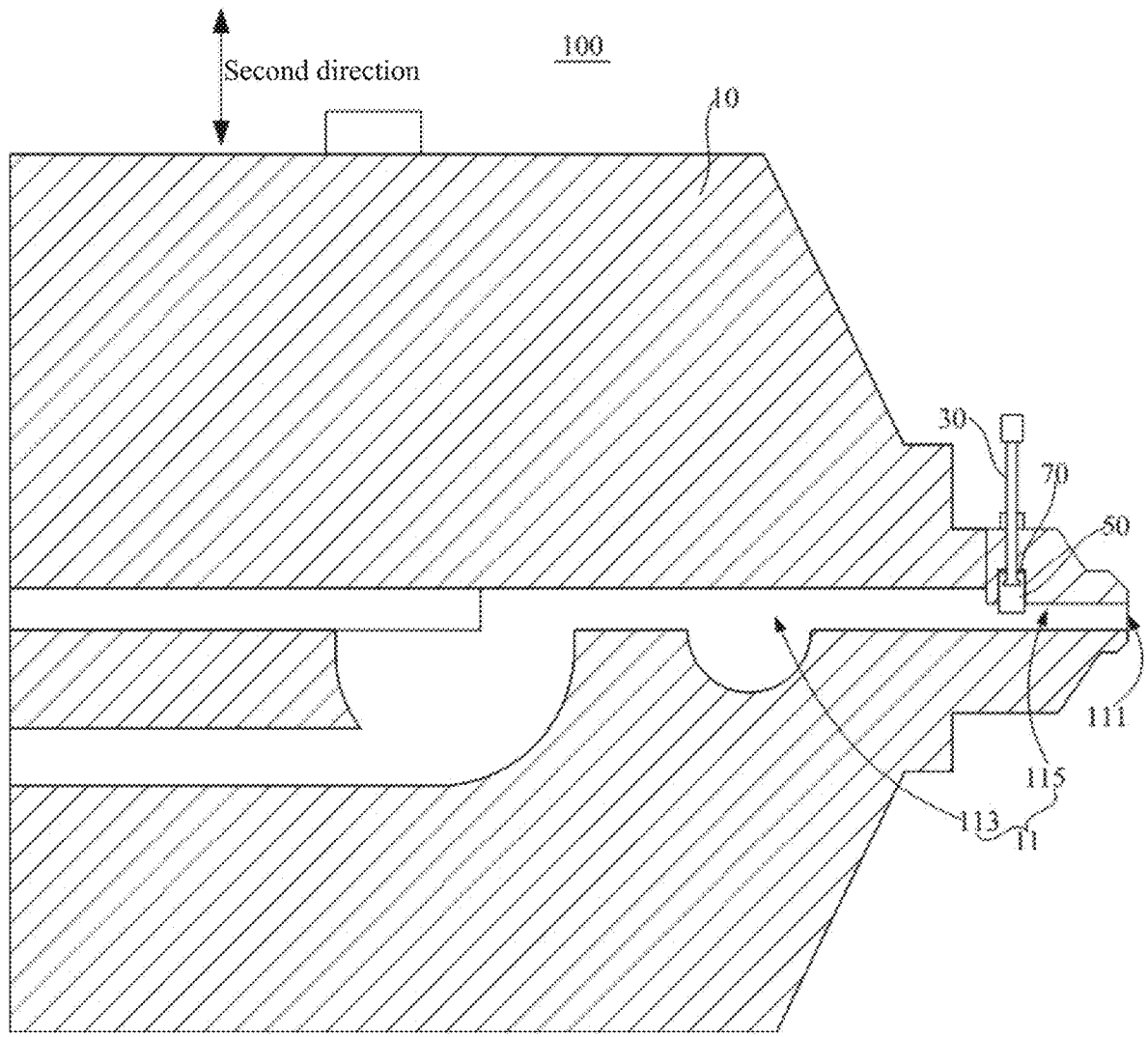
FIG. 2 is a schematic cross-sectional view of the coating die head in FIG. 1.

Referring to FIG. 2, in an embodiment of this application, the discharge channel 11 includes a body section 113 and an outlet section 115 that communicate with each other in sequence in the discharge direction of the discharge channel 11. A cross-sectional area of the outlet section 115 is less than a cross-sectional area of the body section 113, and at least a part of the regulator 50 is movable within the outlet section 115.

The body section 113 is a main part of the discharge channel 11 in the middle, while the outlet section 115 is located downstream of the discharge channel 11 with respect to the body section 113. After the slurry in the body section 113 enters the outlet section 115, the slurry can be extruded to the substrate through an outlet in one end that is of the outlet section 115 and that is far away from the body section 113. That the cross-sectional area of the outlet section 115 is less than the cross-sectional area of the body section 113 may mean that a size of the outlet section 115 between two inner walls in the second direction is smaller than a size of the body section 113 between the two inner walls in the second direction.

In this embodiment, the outlet section 115 is closer to a discharge port 111 of the discharge channel 11 than the body section 113, so after a flow rate of a slurry at a specific region is regulated by the regulator 50, the slurry can be quickly extruded out of the discharge port 111 to form a coating with a required thickness, which is unlikely to be affected by flow-in of the slurry at other regions. Certainly, it should be noted that this application is not limited thereto. In other embodiments, the regulator 50 may be arranged in the body section 113 and close to the outlet section 115.

Figure 3:
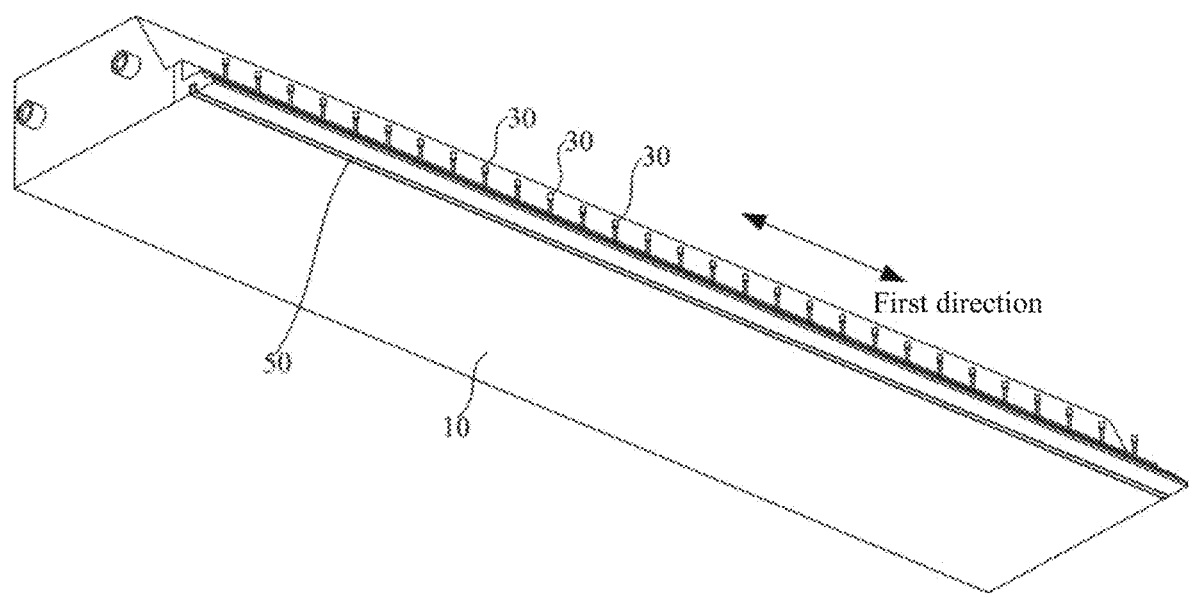
FIG. 3 is a schematic diagram of a local structure of the coating die head in FIG. 1.

Referring to FIG. 3, in an embodiment of this application, the regulator 50 extends along the first direction to form a long strip-shaped structure.

The long strip-shaped structure means that the regulator 50 is a cuboid plate structure or columnar structure, and a length direction is formed in the first direction.

In this embodiment, the regulator 50 extends along the first direction, and the first direction corresponds to a width direction of the coating. Therefore, arranging the regulator 50 in a long strip shape allows the regulator 50 to have a relatively large regulation range, thereby helping to improve the flexibility in thickness regulation of the coating. Certainly, this application is not limited thereto. In other embodiments, the regulator 50 may alternatively be a cube structure.

Referring to FIG. 3, in an embodiment of this application, one regulator 50 is provided, and in the first direction, a length of the regulator 50 is the same as a length of the discharge channel 11.

In this embodiment, one regulator 50 is provided, so that components of the coating die head 100 are significantly reduced. In this way, the structure of the coating die head 100 is simplified, thereby helping to improve the convenience in manufacturing thereof. Moreover, there is only one regulator 50, which can better prevent the possibility of a thickness difference of the coating between adjacent regulators 50. The length of the regulator 50 being the same as the length of the discharge channel 11 can ensure that the regulator 50 can still have a large regulation range when it is provided in a quite small number. Certainly, this application is not limited thereto. In other embodiments, at least two regulators 50 are provided as well; the at least two regulators 50 are distributed in the first direction; each regulator 50 is connected to at least two driving pieces 30; and in the first direction, the lengths of the at least two regulators 50 are the same as the length of the discharge channel 11. In this case, the arrangement of the at least two regulators 50 ensures that different regulators 50 can be driven to move to realize thickness regulation of different regions of the coating in the width direction of the coating, thereby helping to improve the flexibility in thickness regulation of the coating.

In an embodiment of this application, the regulator 50 is made of an anti-corrosion material.

The anti-corrosion material means that the regulator 50 can have acid and alkali resistance.

In this embodiment, the regulator 50 is made of an anti-corrosion material, so that the regulator 50 can be better prevented from corrosion of the slurry during coating, thereby helping to prolong the service life of the regulator 50. Specifically, the regulator 50 may be made of anti-corrosion rubber, silicone, another anti-corrosion polymer material, or the like.

With reference to FIG. 2 and FIG. 3, in an embodiment of this application, the regulator 50 is a cubic structure.

The cubic structure means that the regulator 50 may be a rectangular structure or a square structure.

In this embodiment, the regulator 50 is arranged as a cubic structure, so that the regulator 50 is regular in property, thereby helping to improve the convenience in processing and shaping thereof. In addition, this also allows for a large and flat contact surface between the regulator 50 and the slurry, thereby facilitating flow rate regulation and control of the slurry. Certainly, it should be noted that this application is not limited thereto. In other embodiments, the regulator 50 may alternatively be a cylinder, a structure in another shape, or the like.

Figure 4:
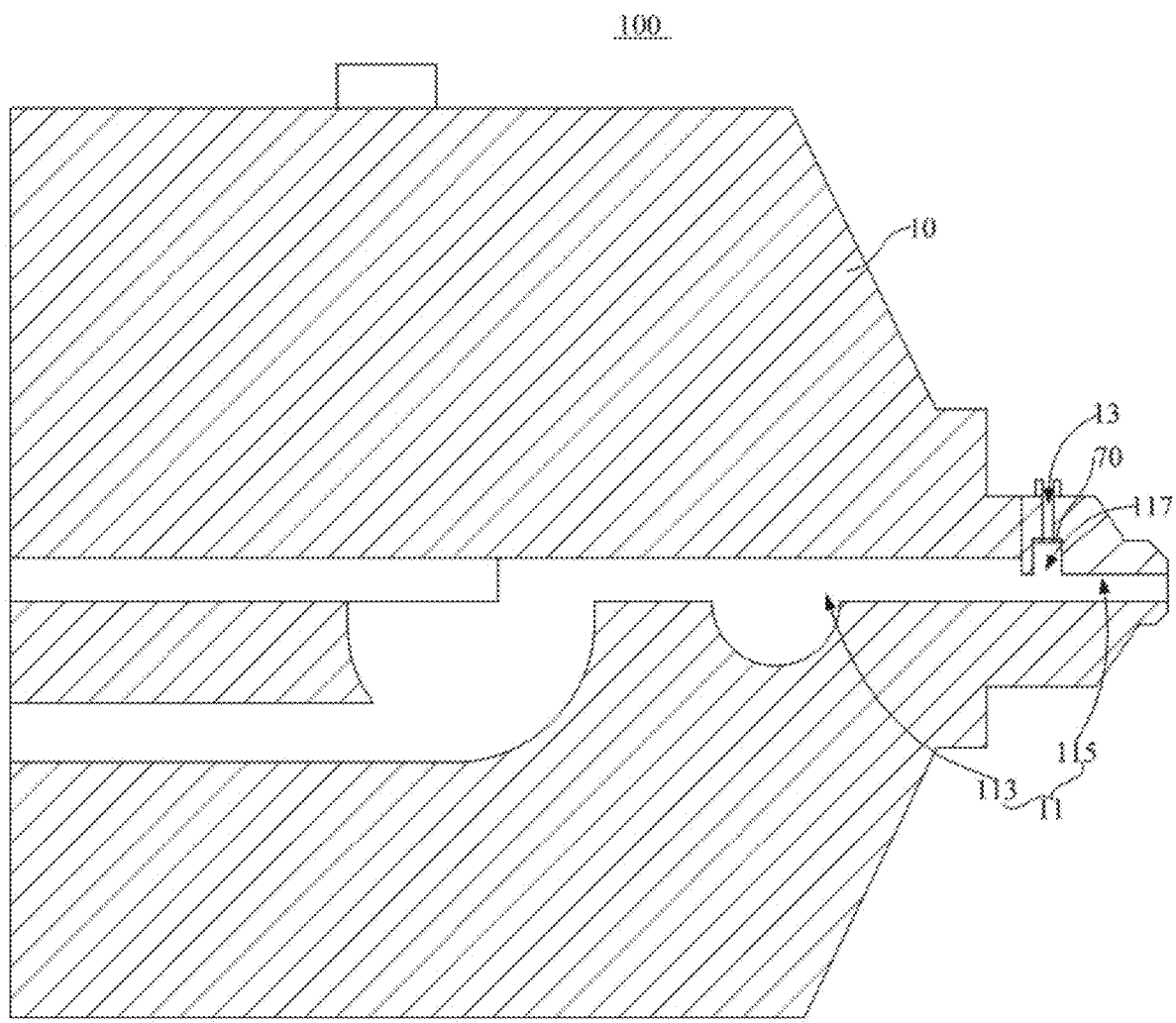
FIG. 4 is a schematic cross-sectional view of a die head body of the coating die head in FIG. 1.

With reference to FIG. 2 to FIG. 4, in an embodiment of this application, an inner wall of the discharge channel 11 is provided with a mounting groove 117, and the regulator 50 is arranged in the mounting groove 117.

The mounting groove 117 may be provided in one of two opposite inner walls of the discharge channel 11 in the second direction, so that the regulator 50 is accommodated in the mounting groove 117. The mounting groove 117 may extend along the first direction so as to correspondingly accommodate the regulator 50 extending along the first direction. In addition, when at least two regulators 50 are provided, the at least two regulators 50 can both be accommodated in this one mounting groove 117.

In this embodiment, the mounting groove 117 can provide a mounting space for the regulator 50, thereby improving the convenience for arranging the regulator 50. Moreover, the regulator 50 can be provided with a relatively large volume, so that the strength of the regulator 50 is enhanced, thereby providing convenience for the regulator 50 to stably implement subsequent regulation work.

With reference to FIG. 2 and FIG. 4, in an embodiment of this application, the die head body 10 is provided with a communicating hole 13 which enables a communication between the mounting groove 117 and the outside, and one end that is of the driving piece 30 and that is far away from the regulator 50 passes through the communicating hole 13 to extend to the outside.

One end that is of the driving piece 30 and that is far away from the regulator 50 passes through the communicating hole 13 to extend to the outside, meaning that the driving piece 30 runs through the communicating hole 13, and one of two opposite ends is located at an outer side of the die head body 10, and the other end is located inside the mounting groove 117 and is connected to the regulator 50.

In this embodiment, at least a part of the driving piece 30 is exposed outside, thereby facilitating a drive operation, a maintenance operation, or the like of the driving piece 30.

With reference to FIG. 2 and FIG. 4, in an embodiment of this application, the coating die head 100 further includes a sealing member 70, where the sealing member 70 is arranged between the regulator 50 and a wall of the mounting groove 117 that communicates with the communicating hole 13.

The sealing member 70 may be configured to seal a space between the regulator 50 and the wall of the mounting groove 117 that communicates with the communicating hole 13, where the sealing member 70 may be made of rubber, silicone, or the like, so that the sealing member 70 can be attached to a position between the regulator 50 and the wall of the mounting groove 117 that communicates with the communicating hole 13 after an elastic deformation caused by extrusion of the regulator 50, thereby ensuring a sealing effect. Besides, one sealing member 70 may be provided for sealing the space between at least two regulator 50 and the wall of the mounting groove 117 that communicates with the communicating hole 13. Certainly, the number of the sealing member 70 may correspond to the number of the regulator 50. In this case, one sealing member 70 seals the space between one regulator 50 and the wall of the mounting groove 117 that communicates with the communicating hole 13.

In this embodiment, by virtue of the sealing effect of the sealing member 70, even if an amount of slurry enters the mounting groove 117, the sealing effect of the sealing member 70 prevents the slurry from further penetrating into the communicating hole 13.

Figure 5:
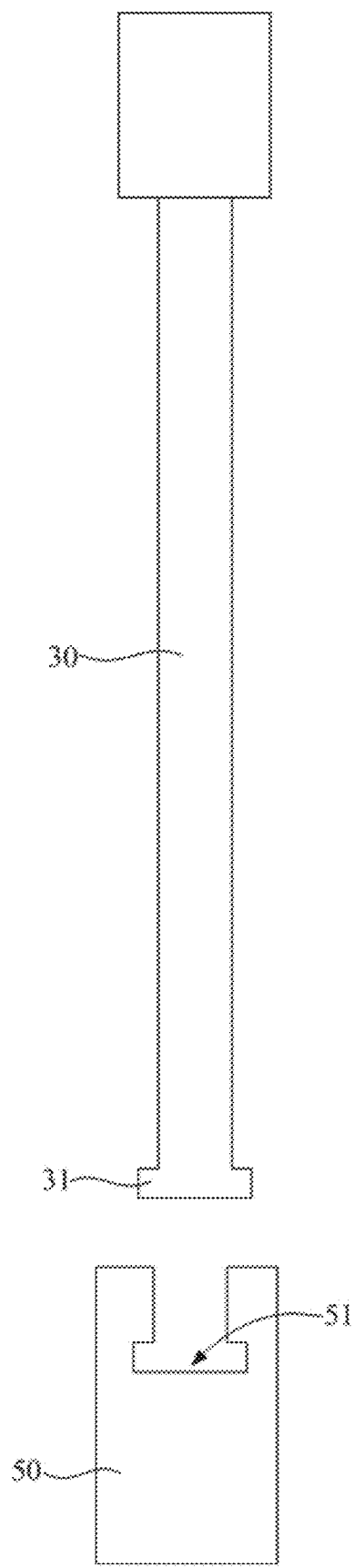
FIG. 5 is a schematic structural exploded view of a driving piece and a regulator of the coating die head in FIG. 1.

With reference to FIG. 2 and FIG. 5, in an embodiment of this application, the driving piece 30 is in threaded connection with at least a part of a section of the communicating hole 13, and the driving piece 30 is rotationally connected to the regulator 50.

The driving piece 30 is in threaded connection with at least a part of a section of the communicating hole 13, meaning that the entire wall of the communicating hole 13 may be provided with an internal thread, or a part of the wall is provided with an internal thread. A lateral circumferential surface of the driving piece 30 is correspondingly provided with an external thread which matches with the internal thread in the communicating hole 13. The driving piece 30 is rotationally connected to the regulator 50, meaning that the driving piece 30 and the regulator 50 can rotate relative to each other in a circumferential direction, and the driving piece 30 is limited in a direction of the rotating axis, that is, being limited in the second direction.

In this embodiment, the driving piece 30 is in threaded connection with the die head body 10, so that the driving piece 30 is movable along the second direction while rotating and thus drives the regulator 50 connected thereto to move, so that the regulator 50 is driven by the driving piece 30. Moreover, in this case, the driving piece 30 is a pure mechanical structure for driving the regulator 50 and does not involve in a circuit, a gas circuit, and the like, thereby improving the safety of the coating die head 100 during use.

Referring to FIG. 5, in an embodiment of this application, the regulator 50 is provided with a clamping groove 51, one end of the driving piece 30 is provided with a clamping head 31, and the clamping head 31 is clamped into the clamping groove 51 and is rotatable in the clamping groove 51.

The clamping groove 51 may be a circular groove body, so that when the driving piece 30 rotates relative to the die head body 10, the clamping head 31 can also rotate in the clamping groove 51. The clamping groove 51 may be formed by two groove bodies that are in communication and combined with each other, where the two groove bodies have different cross sections. The clamping head 31 may be a cylinder in shape, so as to be mounted in match with the clamping groove 51 and rotatable in the clamping groove 51. The clamping head 31 may be formed by two column bodies that are connected and combined with each other, where the two column bodies have different cross sections.

In this embodiment, the driving piece 30 and the regulator 50 are connected through clamping, achieving a simple connecting structure therefor, thereby helping to improve the convenience for assembling them. Moreover, the regulator 50 is made of a flexible material, so the clamping head 31 may also be elastically taken out of the clamping groove 51. In this way, the driving piece 30 and the regulator 50 can be disassembled, thereby helping to improve the convenience for maintaining or replacing the regulator 50 and the driving piece 30. Certainly, it should be noted that this application is not limited thereto. In other embodiments, it is also possible that a part of the regulator 50 is rotationally embedded into the driving piece 30.

With reference to FIG. 1 to FIG. 5, in an embodiment of this application, the coating die head 100 includes a die head body 10, at least two driving pieces 30, and a regulator 50. The die head body 10 is provided with a discharge channel 11 in communication with the outside. The at least two driving pieces 30 are both arranged at the die head body 10 and distributed along a first direction, and the first direction is perpendicular to a discharge direction of the discharge channel 11. The regulator 50 is a flexible member, at least a part of the regulator 50 is arranged in the discharge channel 11 and connected to the at least two driving pieces 30, the driving pieces 30 are configured to drive the regulator 50 to move along a second direction in the discharge channel 11, and the second direction is perpendicular to the first direction and the discharge direction of the discharge channel 11. Further, the discharge channel 11 includes a body section 113 and an outlet section 115 that communicate with each other in sequence in the discharge direction of the discharge channel 11. A cross-sectional area of the outlet section 115 is less than a cross-sectional area of the body section 113, and at least a part of the regulator 50 is movable within the outlet section 115. The regulator 50 extends along the first direction to for a long strip-shaped structure, one regulator 50 is provided, and in the first direction, a length of the regulator 50 is the same as a length of the discharge channel 11. The regulator 50 is made of an anti-corrosion material and is a cubic structure. Furthermore, an inner wall of the discharge channel 11 is provided with a mounting groove 117, and the regulator 50 is arranged in the mounting groove 117. The die head body 10 is provided with a communicating hole 13 which enables a communication between the mounting groove 117 and the outside, and one end of the driving piece 30 far away from the regulator 50 passes through the communicating hole 13 to extend to the outside. The coating die head 100 further includes a sealing member 70, where the sealing member 70 is arranged between the regulator 50 and a wall of the mounting groove 117 that communicates with the communicating hole 13. The driving piece 30 is in threaded connection with at least a part of a section of the communicating hole 13, and the driving piece 30 is rotationally connected to the regulator 50. The regulator 50 is provided with a clamping groove 51, one end of the driving piece 30 is provided with a clamping head 31, and the clamping head 31 is clamped into the clamping groove 51 and is rotatable in the clamping groove 51.

This application further discloses a piece of coating equipment. The coating equipment includes a coating die head 100. For the specific structure of the coating die head 100, reference may be made to the preceding embodiments. The coating equipment employs all the technical solutions of all the preceding embodiments, the coating equipment at least achieve all the beneficial effects brought by the technical solutions of the preceding embodiments, the details of which are omitted here.

The foregoing descriptions are merely optional embodiments of this application, but are not intended to limit the patent scope of this application. All equivalent structural transformations made by using the content of the specification and drawings of this application or directly/indirectly used in other related technical fields under the inventive conception of this application are included in the patent protection scope of this application.

What is claimed is:

1. A coating die head, comprising:
a die head body, the die head body is provided with a discharge channel in communication with an outside;
at least two driving pieces, the at least two driving pieces are both arranged at the die head body and distributed along a first direction, and the first direction is perpendicular to a discharge direction of the discharge channel; and
a regulator, the regulator is a flexible member, at least a part of the regulator is arranged in the discharge channel and connected to the at least two driving pieces, the at least two driving pieces are configured to drive the regulator to move along a second direction in the discharge channel, and the second direction is a vertical direction that is perpendicular to the first direction and the discharge direction of the discharge channel.

2. The coating die head according to claim 1, wherein the discharge channel comprises a body section and an outlet section that are in communication with each other in sequence in the discharge direction of the discharge channel; and
a cross-sectional area of the outlet section of the discharge channel is less than a cross-sectional area of the body section of the discharge channel, and at least a part of the regulator is movable within the outlet section.

3. The coating die head according to claim 1, wherein the regulator extends along the first direction to form a long strip-shaped structure.

4. The coating die head according to claim 3, wherein one regulator is provided, and in the first direction, a length of the regulator is the same as a length of the discharge channel.

5. The coating die head according to claim 3, wherein at least two regulators are provided, the at least two regulators are distributed in the first direction, and each regulator is connected to the at least two driving pieces; and
in the first direction, lengths of the at least two regulators are the same as a length of the discharge channel.

6. The coating die head according to claim 1, wherein the regulator is made of an anti-corrosion material.

7. The coating die head according to claim 1, wherein the regulator is a cubic structure.

8. The coating die head according to claim 1, wherein an inner wall of the discharge channel is provided with a mounting groove, and the regulator is arranged in the mounting groove.

9. The coating die head according to claim 8, wherein the die head body is provided with a communicating hole which enables a communication between the mounting groove and the outside, and one end of one driving piece of the at least two driving pieces that is far away from the regulator passes through the communicating hole to extend to the outside.

10. The coating die head according to claim 9, wherein the coating die head further comprises a sealing member, and the sealing member is arranged between the regulator and a wall of the mounting groove that is in communication with the communicating hole.

11. The coating die head according to claim 9, wherein the one driving piece of the at least two driving pieces is in threaded connection with at least a part of a section of the communicating hole, and the one driving piece of the at least two driving pieces is rotationally connected to the regulator.

12. The coating die head according to claim 11, wherein the regulator is provided with a clamping groove, one end of the one driving piece of the at least two driving pieces is provided with a clamping head, and the clamping head is clamped into the clamping groove and is rotatable in the clamping groove.

13. A piece of coating equipment, comprising the coating die head according to claim 1.

14. The coating die head according to claim 1, wherein the at least two driving pieces are configured to move along the second direction.

15. The coating die head according to claim 1, wherein the regulator has a hexahedral structure.

* * * * *